US011062569B2

(12) United States Patent
Paradise

(10) Patent No.: US 11,062,569 B2
(45) Date of Patent: Jul. 13, 2021

(54) ACROSS-MATCH ANALYTICS IN PEER-TO-PEER GAMING TOURNAMENTS

(71) Applicant: Skillz Inc., San Francisco, CA (US)

(72) Inventor: Andrew Paradise, San Francisco, CA (US)

(73) Assignee: SKILLZ PLATFORM INC., San Francisco, CA (US)

(*) Notice: Subject to any disclaimer, the term of this patent is extended or adjusted under 35 U.S.C. 154(b) by 0 days.

(21) Appl. No.: 15/459,324

(22) Filed: Mar. 15, 2017

(65) Prior Publication Data
US 2017/0270751 A1 Sep. 21, 2017

Related U.S. Application Data

(60) Provisional application No. 62/308,823, filed on Mar. 15, 2016, provisional application No. 62/309,390, filed on Mar. 16, 2016.

(51) Int. Cl.
G07F 17/32 (2006.01)
A63F 13/34 (2014.01)
(Continued)

(52) U.S. Cl.
CPC .......... *G07F 17/3279* (2013.01); *A63F 13/34* (2014.09); *A63F 13/352* (2014.09);
(Continued)

(58) Field of Classification Search
CPC .... A63F 13/798; A63F 13/3279; A63F 13/34; A63F 13/352; A63F 13/44; A63F 13/46; A63F 13/79; A63F 13/86; G07F 17/3279
(Continued)

(56) References Cited

U.S. PATENT DOCUMENTS 5,411,258 A 5/1995 Wilson et al.
6,443,841 B1 9/2002 Rossides
(Continued)

FOREIGN PATENT DOCUMENTS

CN 103945912 A 7/2014
EP 1684228 A1 7/2006
(Continued)

OTHER PUBLICATIONS

TheHunt4—A Borderlands/Twitch.tv Scavenger Hunt, posted Apr. 21, 2015 https://web.archive.org/web/20150415000000*/https://forums.gearboxsoftware.com/t/thehunt4-the-most-comprehensive-borderlands-scavenger-hunt-winner-agentlomax/46637.*
(Continued)

Primary Examiner — Omkar A Deodhar
Assistant Examiner — Ross A Williams
(74) Attorney, Agent, or Firm — Mintz, Levin, Cohn, Ferris, Glovsky and Popeo, P.C.

(57) ABSTRACT

First game state data captured from a first client and characterizing in-game information of a first match of a peer-to-peer digital gaming tournament is received. Second game state data captured from a second client and characterizing in-game information of a second match of the peer-to-peer digital gaming tournament is received. The first match and the second match being separate gaming instances. The first game state data captured during the first match and representative of an internal state of a digital video game. The first game state data and the second game state data is compared using a predefined comparison rule by computing a measure of a performance of a first player in the first match with a measure of a performance of a second player in the second match. The comparison is provided. Related apparatus, systems, articles, and techniques are also described and illustrated.

21 Claims, 8 Drawing Sheets

(51) Int. Cl.
*A63F 13/352* (2014.01)
*A63F 13/44* (2014.01)
*A63F 13/46* (2014.01)
*A63F 13/79* (2014.01)
*A63F 13/798* (2014.01)
*A63F 13/86* (2014.01)

(52) U.S. Cl.
CPC .............. *A63F 13/44* (2014.09); *A63F 13/46* (2014.09); *A63F 13/79* (2014.09); *A63F 13/798* (2014.09); *A63F 13/86* (2014.09)

(58) Field of Classification Search
USPC ................................................ 463/18, 40–42
See application file for complete search history.

(56) References Cited

U.S. PATENT DOCUMENTS

| | | |
|---|---|---|
| 6,676,517 B2 | 1/2004 | Beavers |
| 6,699,127 B1 | 3/2004 | Lobb et al. |
| 6,856,986 B1 | 2/2005 | Rossides |
| 8,088,000 B2 | 1/2012 | Ginsberg et al. |
| 8,210,926 B2 | 7/2012 | Asher et al. |
| 8,313,368 B2 | 11/2012 | Filipour et al. |
| 8,360,873 B1 | 1/2013 | Wickett et al. |
| 8,414,387 B1 | 4/2013 | Paradise et al. |
| 8,485,899 B1* | 7/2013 | Rom ..................... A63F 13/798 463/31 |
| 8,512,129 B2 | 8/2013 | Ginsberg et al. |
| 8,545,330 B2 | 10/2013 | Wickett et al. |
| 8,562,422 B2 | 10/2013 | Lutnick |
| 8,568,222 B2 | 10/2013 | Gagner et al. |
| 8,613,662 B2 | 12/2013 | Morrow et al. |
| 8,641,511 B2 | 2/2014 | Ginsberg et al. |
| 8,651,948 B2 | 2/2014 | Asher et al. |
| 8,683,272 B2 | 3/2014 | Cadima et al. |
| 8,715,077 B2 | 5/2014 | Paradise et al. |
| 8,790,170 B2 | 7/2014 | Arnone et al. |
| 8,882,576 B1 | 11/2014 | Paradise et al. |
| 8,900,054 B2 | 12/2014 | Patel |
| 8,926,435 B2 | 1/2015 | Perry et al. |
| 9,240,101 B2 | 1/2016 | Paradise et al. |
| 9,349,246 B1 | 5/2016 | Paradise et al. |
| 9,446,315 B2 | 9/2016 | Paradise et al. |
| 9,479,602 B1 | 10/2016 | Paradise et al. |
| 9,630,097 B2 | 4/2017 | Paradise et al. |
| 9,649,564 B2 | 5/2017 | Paradise et al. |
| 9,697,680 B2 | 7/2017 | Paradise et al. |
| 9,767,644 B2 | 9/2017 | Paradise et al. |
| 2001/0031663 A1 | 10/2001 | Johnson |
| 2001/0044339 A1 | 11/2001 | Cordero et al. |
| 2002/0037767 A1 | 3/2002 | Ebin |
| 2002/0039923 A1* | 4/2002 | Cannon ................... G07F 17/32 463/42 |
| 2002/0073021 A1 | 6/2002 | Ginsberg et al. |
| 2002/0160824 A1 | 10/2002 | Goto et al. |
| 2004/0023734 A1* | 2/2004 | McClain ............ A63B 24/0084 473/409 |
| 2004/0204217 A1 | 10/2004 | Herman |
| 2004/0225387 A1* | 11/2004 | Smith, III ................ G07F 17/32 700/92 |
| 2005/0043089 A1 | 2/2005 | Nguyen et al. |
| 2005/0090307 A1 | 4/2005 | Walker et al. |
| 2006/0058103 A1 | 3/2006 | Danieli et al. |
| 2006/0080175 A1 | 4/2006 | Rowe et al. |
| 2006/0098013 A1 | 5/2006 | Wong et al. |
| 2006/0189382 A1 | 8/2006 | Muir et al. |
| 2007/0004509 A1 | 1/2007 | Banton |
| 2007/0026934 A1 | 2/2007 | Herbrich et al. |
| 2007/0037623 A1 | 2/2007 | Romik |
| 2007/0072676 A1 | 3/2007 | Baluja |
| 2007/0136817 A1 | 6/2007 | Nguyen |
| 2007/0191101 A1 | 8/2007 | Coliz et al. |
| 2007/0265092 A1 | 11/2007 | Betteridge |
| 2008/0033734 A1 | 2/2008 | Carry |
| 2008/0108438 A1 | 5/2008 | Sugiyama et al. |
| 2008/0153588 A1 | 6/2008 | Muir et al. |
| 2008/0161113 A1 | 7/2008 | Hansen et al. |
| 2008/0200242 A1 | 8/2008 | Ginsberg et al. |
| 2008/0201159 A1 | 8/2008 | Gabrick et al. |
| 2008/0207327 A1 | 8/2008 | Van Luchene et al. |
| 2008/0214301 A1 | 9/2008 | Sandige et al. |
| 2008/0234047 A1 | 9/2008 | Nguyen |
| 2008/0268961 A1 | 10/2008 | Brook et al. |
| 2008/0287183 A1 | 11/2008 | Reeves, III |
| 2009/0005161 A1* | 1/2009 | Aouizerate ............. G07F 17/32 463/25 |
| 2009/0048010 A1 | 2/2009 | Kroeckel et al. |
| 2009/0099924 A1 | 4/2009 | Lensch et al. |
| 2009/0131177 A1 | 5/2009 | Pearce |
| 2009/0170608 A1 | 7/2009 | Herrmann et al. |
| 2009/0197665 A1 | 8/2009 | Christensen |
| 2009/0208181 A1 | 8/2009 | Cottrell |
| 2009/0209350 A1 | 8/2009 | Kelly et al. |
| 2009/0215540 A1 | 8/2009 | Perlman et al. |
| 2009/0227313 A1 | 9/2009 | Minka et al. |
| 2009/0325709 A1 | 12/2009 | Shi |
| 2010/0022307 A1* | 1/2010 | Steuer .................... A63F 13/12 463/42 |
| 2010/0144426 A1 | 6/2010 | Winner et al. |
| 2010/0166062 A1 | 7/2010 | Perlman et al. |
| 2010/0216536 A1 | 8/2010 | Gagner et al. |
| 2010/0222124 A1 | 9/2010 | Goshen |
| 2010/0234101 A1 | 9/2010 | Morrow et al. |
| 2010/0241699 A1 | 9/2010 | Muthukumarasamy et al. |
| 2010/0304860 A1 | 12/2010 | Gault et al. |
| 2010/0311496 A1 | 12/2010 | Taylor et al. |
| 2011/0010386 A1 | 1/2011 | Zeinfeld |
| 2011/0072056 A1 | 3/2011 | Bakalash et al. |
| 2011/0130197 A1 | 6/2011 | Bytnar et al. |
| 2011/0212766 A1 | 9/2011 | Bowers et al. |
| 2011/0254223 A1 | 10/2011 | Valentine |
| 2011/0281645 A1 | 11/2011 | Wolfson et al. |
| 2011/0300949 A1 | 12/2011 | Filipour et al. |
| 2012/0004039 A1 | 1/2012 | Perry et al. |
| 2012/0013622 A1 | 1/2012 | Mahajan et al. |
| 2012/0028718 A1 | 2/2012 | Barclay et al. |
| 2012/0100918 A1 | 4/2012 | Ginsberg et al. |
| 2012/0122553 A1 | 5/2012 | Bunch et al. |
| 2012/0156668 A1 | 6/2012 | Zelin |
| 2012/0178514 A1 | 7/2012 | Schulzke et al. |
| 2012/0196687 A1 | 8/2012 | Graham et al. |
| 2012/0252579 A1 | 10/2012 | Sethi et al. |
| 2012/0281080 A1 | 11/2012 | Wang |
| 2012/0295715 A1* | 11/2012 | Dobrosevic ......... G07F 17/3225 463/42 |
| 2013/0029760 A1 | 1/2013 | Wickett et al. |
| 2013/0079072 A1 | 3/2013 | Filipour et al. |
| 2013/0121614 A1 | 5/2013 | Intwala |
| 2013/0151614 A1 | 6/2013 | Beerse et al. |
| 2013/0165196 A1 | 6/2013 | Kroeckel et al. |
| 2013/0172086 A1 | 7/2013 | Ikenaga |
| 2013/0179798 A1 | 7/2013 | Korupolu et al. |
| 2013/0217482 A1 | 8/2013 | Kelly et al. |
| 2013/0226983 A1 | 8/2013 | Beining et al. |
| 2013/0273987 A1 | 10/2013 | Laycock et al. |
| 2013/0331177 A1 | 12/2013 | Arnone et al. |
| 2013/0339473 A1 | 12/2013 | McCaffrey et al. |
| 2013/0344960 A1 | 12/2013 | Perry et al. |
| 2013/0344963 A1 | 12/2013 | Gupta et al. |
| 2014/0024427 A1 | 1/2014 | Cole et al. |
| 2014/0024437 A1 | 1/2014 | Vann et al. |
| 2014/0031132 A1 | 1/2014 | Wickett et al. |
| 2014/0045589 A1 | 2/2014 | Paradise et al. |
| 2014/0094267 A1 | 4/2014 | Davis et al. |
| 2014/0100023 A1 | 4/2014 | Arnone et al. |
| 2014/0128147 A1 | 5/2014 | Yu Cheng et al. |
| 2014/0194188 A1 | 7/2014 | Kosta et al. |
| 2014/0200062 A1 | 7/2014 | Paradise et al. |
| 2014/0323199 A1* | 10/2014 | DiMichele .......... G07F 17/3276 463/20 |
| 2014/0323204 A1 | 10/2014 | Paradise et al. |
| 2015/0024839 A1 | 1/2015 | Zahn et al. |

(56) References Cited

U.S. PATENT DOCUMENTS

| | | |
|---|---|---|
| 2015/0065226 A1 | 3/2015 | Paradise et al. |
| 2015/0121437 A1 | 4/2015 | Tan |
| 2015/0202529 A1 | 7/2015 | Paradise et al. |
| 2015/0348373 A1* | 12/2015 | Weingardt .......... G07F 17/3258 463/32 |
| 2016/0055710 A1 | 2/2016 | Paradise et al. |
| 2016/0110960 A1 | 4/2016 | Paradise et al. |
| 2016/0253866 A1 | 9/2016 | Paradise et al. |
| 2017/0225075 A1 | 8/2017 | Paradise et al. |
| 2017/0249802 A1 | 8/2017 | Paradise et al. |
| 2017/0266549 A1 | 9/2017 | Paradise |
| 2017/0266552 A1 | 9/2017 | Paradise et al. |

FOREIGN PATENT DOCUMENTS

| | | |
|---|---|---|
| EP | 1738810 A1 | 1/2007 |
| EP | 2695650 A1 | 2/2014 |
| JP | 2002355444 A | 12/2002 |
| JP | 2003144745 A | 5/2003 |
| JP | 2015531622 A | 11/2015 |
| KR | 20000018932 A | 4/2000 |
| WO | WO-2011149564 A1 | 12/2011 |
| WO | 2014025971 A1 | 2/2014 |

OTHER PUBLICATIONS

Dreef et al., Measuring skill in games: several approaches discussed. Mathematical Methods of Operations Research. 2004;59(3):375-91.

Fiedler et al., Quantifying Skill in Games—Theory and Empirical Evidence for Poker. Gaming Law Review and Economics. 2009;13(1):50-7.

International Preliminary Report on Patentability and Written Opinion issued in Int'l Application No. PCT/US2014/035876 dated Nov. 12, 2015.

International Search Report issued in Int'l Application No. PCT/US2014/035876 dated Oct. 17, 2014.

International Search Report and Written Opinion for Application No. PCT/US2017/022423 dated Nov. 8, 2017.

International Search Report and Written Opinion for Application No. PCT/US2017/022412 dated Jun. 16, 2017.

International Search Report and Written Opinion for Application No. PCT/US2017/022440 dated Jun. 6, 2017.

* cited by examiner

ACROSS-MATCH ANALYTICS IN PEER-TO-PEER GAMING TOURNAMENTS

CROSS REFERENCE TO RELATED APPLICATIONS

This application claims priority under 35 U.S.C. § 119(e) to U.S. Provisional Patent Application No. 62/308,823 filed Mar. 15, 2016, and claims priority under 35 U.S.C. § 119(e) to U.S. Provisional Patent Application No. 62/309,390 filed Mar. 16, 2016, the entire contents of each of which is hereby incorporated by reference herein.

TECHNICAL FIELD

The subject matter described herein relates to comparing game states and player performance across disparate game matches.

BACKGROUND

Multiplayer online synchronous digital video games in which multiple players participate in the same match allow for direct comparison between player performances in the match because each player shares the same game state. For example, in a digital tennis match, each player interacts with a shared game state (and each other). Such multiplayer synchronous games also allow for automatic game analysis beyond each player's performance, such as the number of times a particular event occurs or identifying which player has the greatest change in score over a given time period because a single game state can be directly analyzed and each player's performance is referenced to the single and common game state.

In contrast, some peer-to-peer video game tournaments provide competitions in which players compete in separate game matches (possibly at the same or different times) but their performance is compared across matches to determine tournament outcome. For example, two players may each play a single player game (e.g., a stage of Tetris) and their final score can be compared to determine a winner.

SUMMARY

In an aspect, first game state data captured from a first client and characterizing in-game information of a first match of a peer-to-peer digital gaming tournament is received. Second game state data captured from a second client and characterizing in-game information of a second match of the peer-to-peer digital gaming tournament is received. The first match and the second match are separate gaming instances. The first game state data captured during the first match and representative of an internal state of a digital video game. The first game state data and the second game state data are compared using a predefined comparison rule by computing a measure of a performance of a first player in the first match with a measure of a performance of a second player in the second match. The comparison is provided. At least one of the receiving, comparing, and providing is performed by at least one data processor forming part of at least one computing system.

One or more of the following features can optionally be included in any feasible combination. The predefined comparison rule can define the measure of the performance of the first player and the measure of the performance of the second player. A first video capture can be received from the first client of a display of the first match. A second video capture can be received from the second client of a display of the second match. A portion of the first video capture or a portion of the second video capture can be selected based on the comparison. At least one of the portion of the first video capture and the portion of the second video capture can be streamed to at least one viewing client.

The first game state data and the second game state data can be compared periodically and at multiple time points. The first match and the second match can begin at different times. The first game state data can be registered in time to the second game state data. Time can be referenced to a game time, an absolute time, or a tournament time. The first game state data can characterize a value of one or more in-game data objects at two or more points of time during the first match. The first client can receive game data from a third party game server. The game data can be for implementing the first match.

The first match and the second match can be separate instances of the digital video game. The digital video game can be an asynchronous game. The digital video game can be a single player asynchronous game. The first match and the second match can be played concurrently. The predefined comparison rule can be previously defined by a user. The comparing can include identifying at least one period of time during the first match or the second match in which an event occurs.

The receiving of the first game state data can occur during the first match. The receiving of the first game state data can occur periodically during the first match. The first game state data can include: instantaneous score, change in score over a predefined period of time, character position, and/or character health.

The first match and the second match can be initiated with a common random number seed to provide common starting conditions. The first client and the second client can include separate computing systems in communication with a third party game server and an analytics server via a network, the third party game server separate from the analytics server. At least one of the receiving, comparing, and providing can be performed by the analytics server.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

While a final match score is comparable once both matches are complete, it may be challenging to automatically make meaningful comparisons between matches during gameplay because the players have separate and independent game states that are not in a format that can be easily and directly compared. Similarly, automatic game analysis of aspects beyond each player's performance, such as the number of times a particular event occurs or identifying which player has the greatest change in score over a given time period, is also challenging because the players have separate and independent game states that are not in a format that can be easily and directly compared.

The current subject matter relates to comparing otherwise unjoinable sets of data, for example, to enable comparing game states and player performance across disparate game matches. While multiplayer synchronous games allow for comparison between player performance when the players participate in a common match (e.g., the same match or game instance), the current subject matter enables comparison and analytics across multiple disparate matches, such as multiple single player matches. The current subject matter enables across-match analytics in peer-to-peer digital video game tournaments using video games that do not easily allow for across-match comparison. In some implementations, the comparison can be performed by capturing game data from each client rather than requiring access to a third party game server, for example a third party game server that creates and/or controls the game state data.

The across-match analytics can be used, in an example implementation, in an eSports stream management system for automatically suggesting or recommending portions of video streams to broadcast in real time and during a live peer-to-peer digital videogame tournament.

Figure 1:
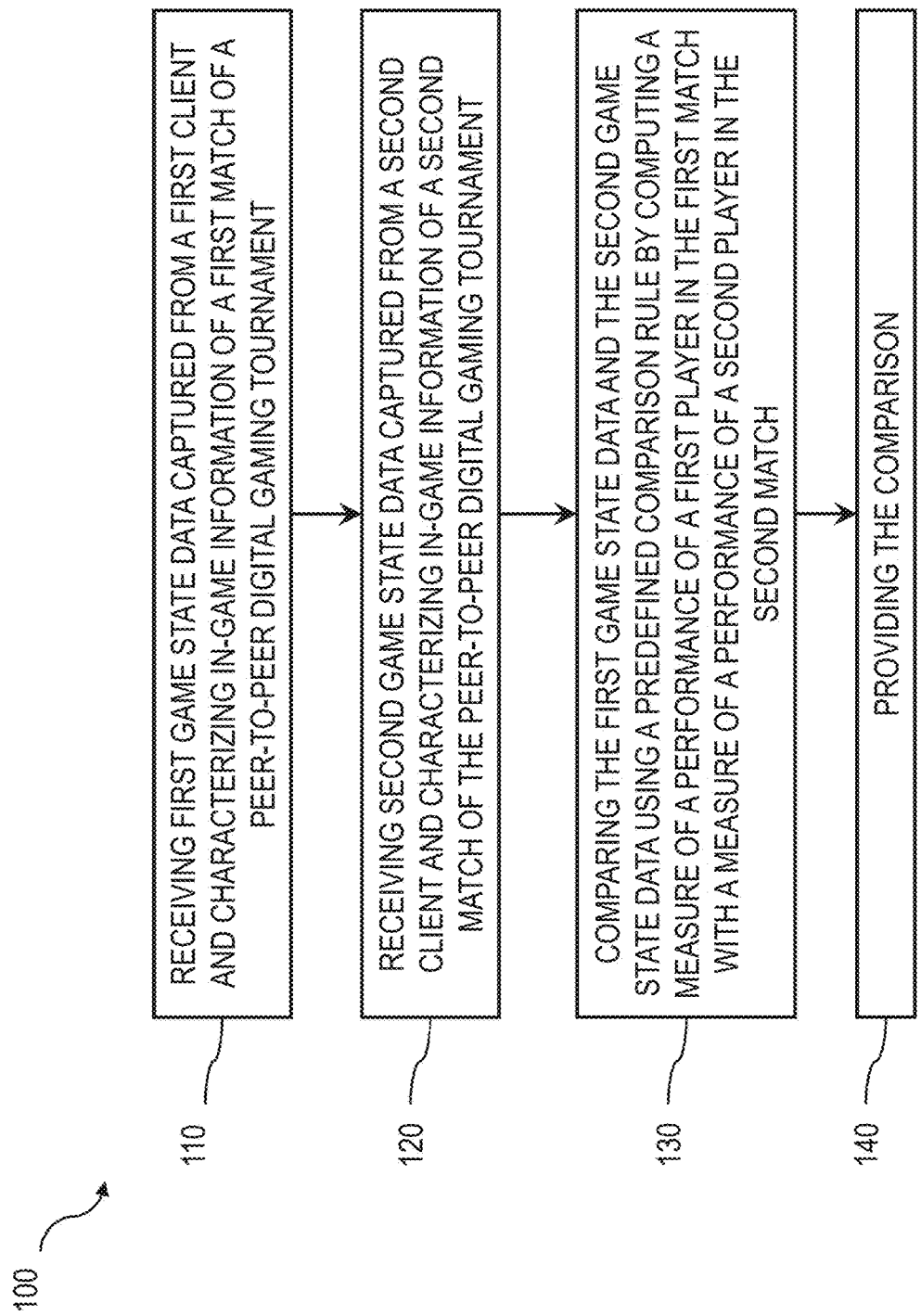
FIG. 1 is a process flow diagram illustrating a process of comparing disparate game state data from multiple matches in an online peer-to-peer digital gaming tournament.

FIG. 1 is a process flow diagram illustrating a process 100 of comparing disparate game state data from multiple matches in an online peer-to-peer digital gaming tournament. The peer-to-peer digital gaming tournament may be an online tournament in which players compete across separate game matches (also referred to as game instances) so that not all tournament participants share the same game state. The players may participate in the tournament by executing a local application of an online video game on their clients, which can exchange game data with a third party game server in order to implement the gaming experience. For example, in an online video game, the third party game server (which can be a game developer server or other server that supports game play but that is separate from one or more servers implementing a eSports stream management system consistent with implementations of the current subject matter) can provide data about game state features (e.g., key objectives or milestones that a player or players must reach or overcome), scoring approaches, other game characteristics, game state data, and the like. Such data can come directly from a client machine on which a user is playing a game, or it can be provided from the third party server interacting with the client to administer the game being played by the user on the client machine.

At 110, game state data is received from a first client. The game state data can be captured at the first client rather than, for example, received from a third party game server when the associated video game is an online game. The game state data can include in-game information of a match in the peer-to-peer digital gaming tournament. The game state data can relate to the particular type of game being played and can include any game-specific parameter or metric. For example, game state data can include instantaneous score, change in score over a predefined period of time, character position, character health, objectives reached/overcome, bonuses gained, extra powers or equipment gained or used, and the like. The game state data can include one or more data objects used by and internal to the video game for execution of the match. Game state data includes state data for the game during match play (e.g., in the middle of a match) rather than only a final state of the match (e.g., a final score) and can include data for two or more points in time. In some implementations, the game data can be received during the match (e.g., before the match ends) and may be received periodically (e.g., multiple times during the match, every second, 10 seconds, minute, and the like).

At 120, game state data from a second client can be received. This second game state data can be from a second match, different and separate from the first match described with respect to step 110. The second match can be part of the peer-to-peer digital game tournament. The second game state data can include in-game information of the second match.

At 130, the first game state data and the second game state data can be compared. The comparison can be performed using a predefined comparison rule, which can be predefined, for example, by a user or tournament host who defines a custom comparison metric. The comparison can include computing a measure of performance of a player in the first match and a player in the second match. For example, in an implementation in which the first and second matches are played substantially concurrently, the measure of performance can include a score for a given interval of time during the middle of game play. The measure of performance can include identifying an event. For example, an in-game achievement such as a "head shot" (seen in some first-person shooters) can be a measure of performance. In some implementations a time period during the match in which the event occurs can also be identified. In some implementations, the predefined comparison rule defines the measures of performance of the players.

The comparison can be performed at multiple points in time, for example, periodically such as when and if new game state data is received.

At 140, the comparison can be provided. The providing can include, for example, sending the comparison or a characterization of the relative performance of the players to other tournament participants. As described more fully below, the comparison can be used in an eSports stream management system to automatically recommend portions of video to broadcast or include in a highlights reel. In some implementations, the peer-to-peer tournament can be a peer wagering competition in which peers receive funds based on the outcome of the tournament and the comparison can be provided to a fund escrow server for determining and managing tournament payouts. For example, the participant having the most number of rows cleared in the first two minutes of Tetris play (as determined by an implementation of the current subject matter) can be receive a payout.

In some implementations, the game state data can be registered in time so that both the first and second game state data references to a common time. For example, if a first match begins play at 12:00 while a second match begins play at 12:06, a comparison between matches at 12:07 may provide some comparison but a user or tournament host may wish to compare the first match at 12:01 to the second match at 12:07 (e.g., when both matches have had 1 minute of gameplay) to provide a more direct comparison. As part of a meaningful comparison, several different common time references can be used. The common time references can include a game time (e.g., measured from the start of game play), a tournament time (e.g., measured from the start of a tournament), an absolute time (e.g., measured to a common clock, such as Coordinated Universal Time (UTC)), and the like.

In some implementations, the across-match comparison can be used in an eSports stream management system to automatically recommend portions of video to broadcast or include in a highlights reel. The cross-match comparison can provide automatic detection of portions of video or players in the game in which interesting or relevant or entertaining play occurs. In an eSports streaming management system, a first video capture of the first match and from the first client can be received. The video capture can be performed at the client, for example, by capturing user interface screen shots at a predetermine rate, capturing open graphics library (openGL) layers; and capturing data through a pixel buffer and forming video data from the captured data. The eSports streamlining management system can receive a second video capture from the second client of the second match. A portion of the first video capture and/or a portion of the second video capture can be selected using the comparison. By using the across-match comparison, the eSports Management System can identify portions of gameplay that may be interesting to a viewer. For example, at any given point during two matches, viewers may be interested in seeing the greatest "play", which may be identified as the greatest change in score. The selected portion of video capture can be streamed to one or more viewing clients.

In some implementations, a user or tournament host can specify or define the predefined comparison rule. This allows for customization of the comparison process.

In some implementations, the matches may be initiated with a common random number generator seed to cause the starting conditions of each match to be identical. Use of a common random number generator seed can impose fairness in games having elements of randomness in that random elements will start in the same condition. By starting games in the same conditions, a player's performance is less dependent on the random number generator (or conversely, two players will have a level playing field). Using a common random number generator seed further allows for better comparison of game state data and performance between otherwise separate game matches.

Figure 2:
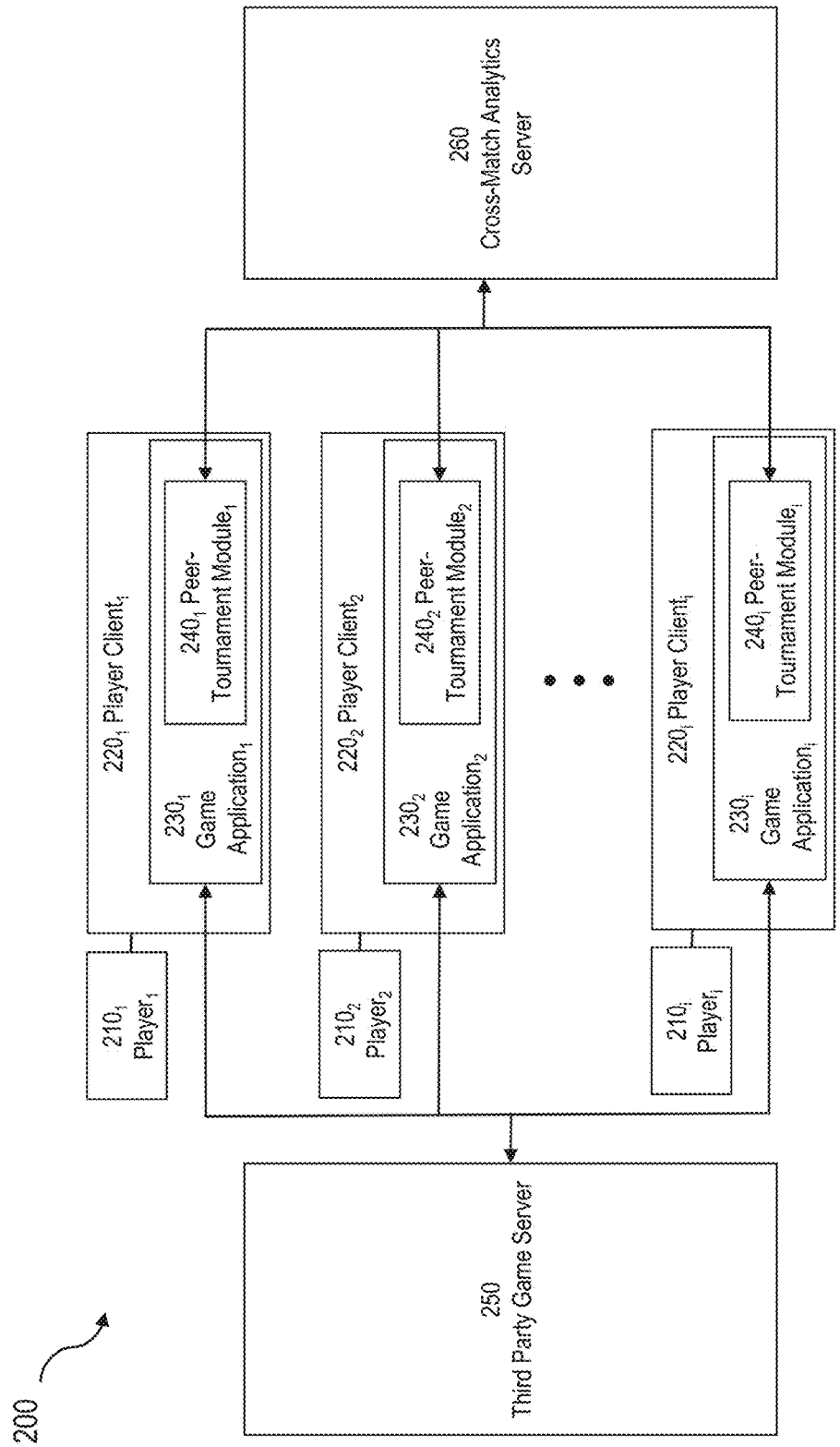
FIG. 2 is a system block diagram illustrating a system for implementing a peer-to-peer digital gaming tournament.

FIG. 2 is a system block diagram illustrating a system 200 for implementing a peer-to-peer digital gaming tournament. The system 200 includes an across-match analytics server 260 that enables comparing disparate game state data from multiple matches.

A plurality of players $210_i$ (i=1, 2, . . . , N) operate respective player clients $220_i$. Each player client $220_i$ includes a third party game application $230_i$. The game application $230_i$, can be any online digital game (e.g., video game). In some implementations, multiple players $210_i$ can compete against one another online. Games can be consistent across game applications $230_i$ (e.g., if the players $210_i$ are playing chess, each game application $230_i$ is an instance of an electronic chess game). Each game application $230_i$ can be in communication with and receiving game data from a third party game server 250. The game server 250 provides game data necessary to operate the game. Clients $210_i$ may include mobile devices (e.g., smartphones, tablets, and the like) and the clients $210_i$, third party game server 250, and across-match analytics server 260 can implement the tournament over a network, such as the internet.

Each game application $230_i$ includes a peer-tournament module $240_i$. Peer-tournament module $240_i$ integrates into game application $230_i$ and enables players $210_i$ to enroll and participate in an online game competition. Peer-tournament module $240_i$ communicates with and works in tandem with the across-match analytics server 260. While a game application $230_i$ is running a match (e.g., a game instance), the game application $230_i$ has an internal game state that changes over time as the associated player $210_i$ interacts with (e.g., plays) the game. Peer-tournament module $240_i$ can capture the game state data periodically, and/or continuously and transmit the captured game state to the across-match analytics server 260. The across-match analytics server 260 can receive the game state from multiple peer-tournament modules $240_i$ and, as described above with reference to FIG. 1, compare the game states across matches. The matches may be separate in that they do not share a game state. For example, each game application $230_i$ can be an asynchronous single player game.

In some implementations, the peer-tournament module $240_i$ and the across-match analytics server 260 does not provide game data to the game application $230_i$. In other words, in some implementations, they do not contribute to implementing a game instance but rather observe the game, capture game state, and enable a separate layer of multi-match tournament functionality.

Figure 3:
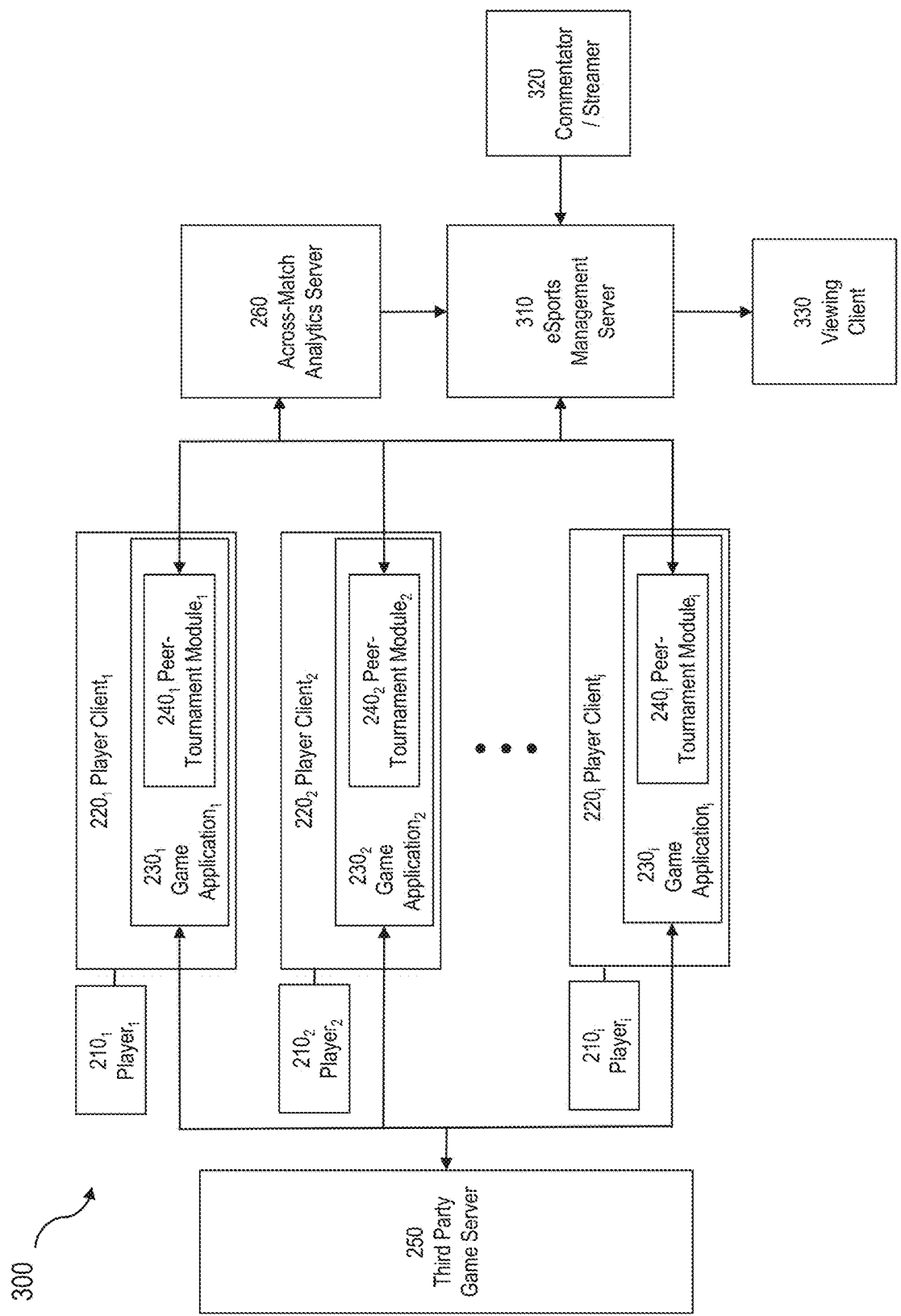
FIG. 3 is a system block diagram of a system with an example eSports Management system utilizing cross-match analytics to provide automatic recommendations for which portions of video to stream of an online eSports tournament.

FIG. 3 is a system block diagram of a system 300 with an example eSports Management system 310 utilizing cross-match analytics to provide automatic recommendations for which portions of video to stream of an online eSports tournament. The example system 300 includes the components as described above with reference to FIG. 2 and further includes an eSports management server 310. ESports management server 310 interfaces with a tournament commentator 320, which can be the tournament host, participant, or third party (also referred to as a streamer 320). ESports management server 310 can provide an automated virtual broadcast studio for tournament commentator 320 to cover an eSports tournament. eSports management server 310 receives the cross-match comparison from the across-match analytics server 260 and can automatically break down video into highlight reels and key segments, provide the game analytics to viewing clients 330 and/or players 210, and assemble a suggested broadcast for the tournament commentator 320. eSports management server 310 can broadcast a live video feed (as controlled by tournament commentator 320) to players 210, and/or viewing clients 330.

In general, video game streamers can engage with their audience by showing live footage of their own gameplay. But in an eSports tournament, mere streaming of a display does not convey what is happening to other players in separate parts of a game or eSports competition. As eSports grow in popularity, the eSports management server 310 solves a need for a toolkit that allows streamers, as individuals, to perform the same level of commentary and gameplay analytics that is performed by analyst teams in the parallel industry of physical sports.

Figure 4:
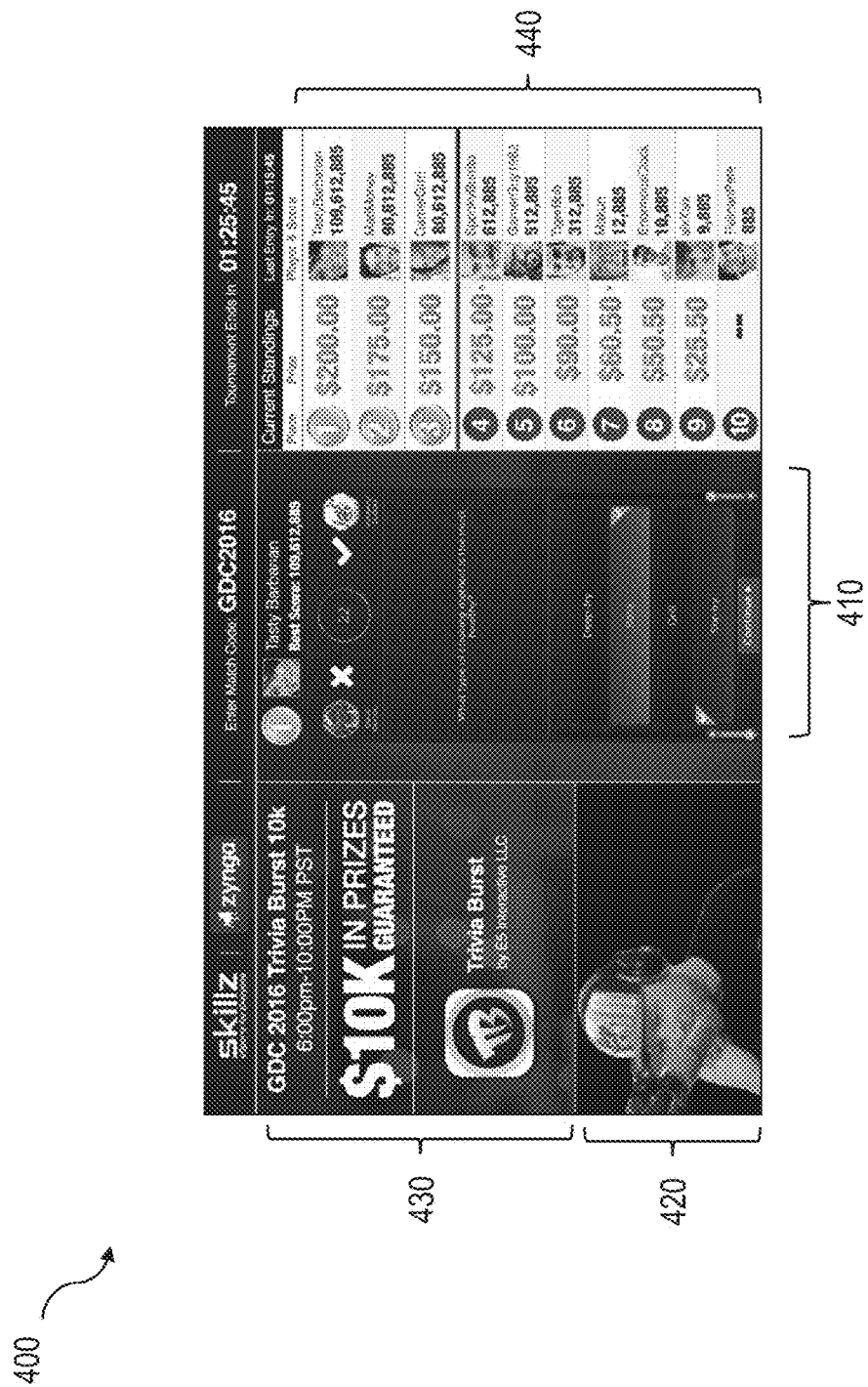
FIG. 4 is an example interface illustrating example content shared by a tournament commentator.

ESports management server 310 provides an automated broadcast studio for a streamer 320 to cover (e.g., comment on) an eSports tournament in any game. The eSports Streaming Management System has two types of end users. The first is the stream viewer 330. The viewer 330 does not have exposure to stream tools that are available as part of the eSports management server 310. Instead, the viewers 330 are able to see the content shared by the tournament commentator 320. An example of the content shared by the tournament commentator 320 is illustrated in FIG. 4. This includes video replays 410, a feed of the streamer 420, tournament information 430, and current leaderboard status 440.

The second end type of user is the tournament commentator 320 or "streamer" who uses the ESports management server 310 to deliver a high quality and engaging video feed to their audience. The streamer is able to capture video from all tournament participants; preview the captured video to privately view the replay of a player without sharing that video to the live stream; interact with a video queue interface to view, select, and play videos or clips; and receive suggestions for automatically portioned and assembled video broken into highlight reels and/or key segments with game analytics.

ESports management server 310 in combination with peer-tournament module 240, automatically captures and records video replay of all players 210, who participate in a tournament. Through the eSports Management System 310, a streamer 320 hosting a tournament has access to a list of all competitors or players 210, in the event that he or she is hosting and each player's 210, associated video capture. For each player 210, the streamer 320 has at least two actions that they can take using the captured video replay. They can preview the captured video in which the streamer 320 privately views the captured video of a player 210, without sharing that video to the live stream. This tool gives the streamer 320 flexibility to review plays before having to speak about them, seek out a specific moment of the replay that he or she wants to show, or otherwise preview the video before showing it to his or her audience. The streamer 320 can also add the selected video to a video queue, which specifies the next video portions to be streamed on the live broadcast stream.

Figure 5:
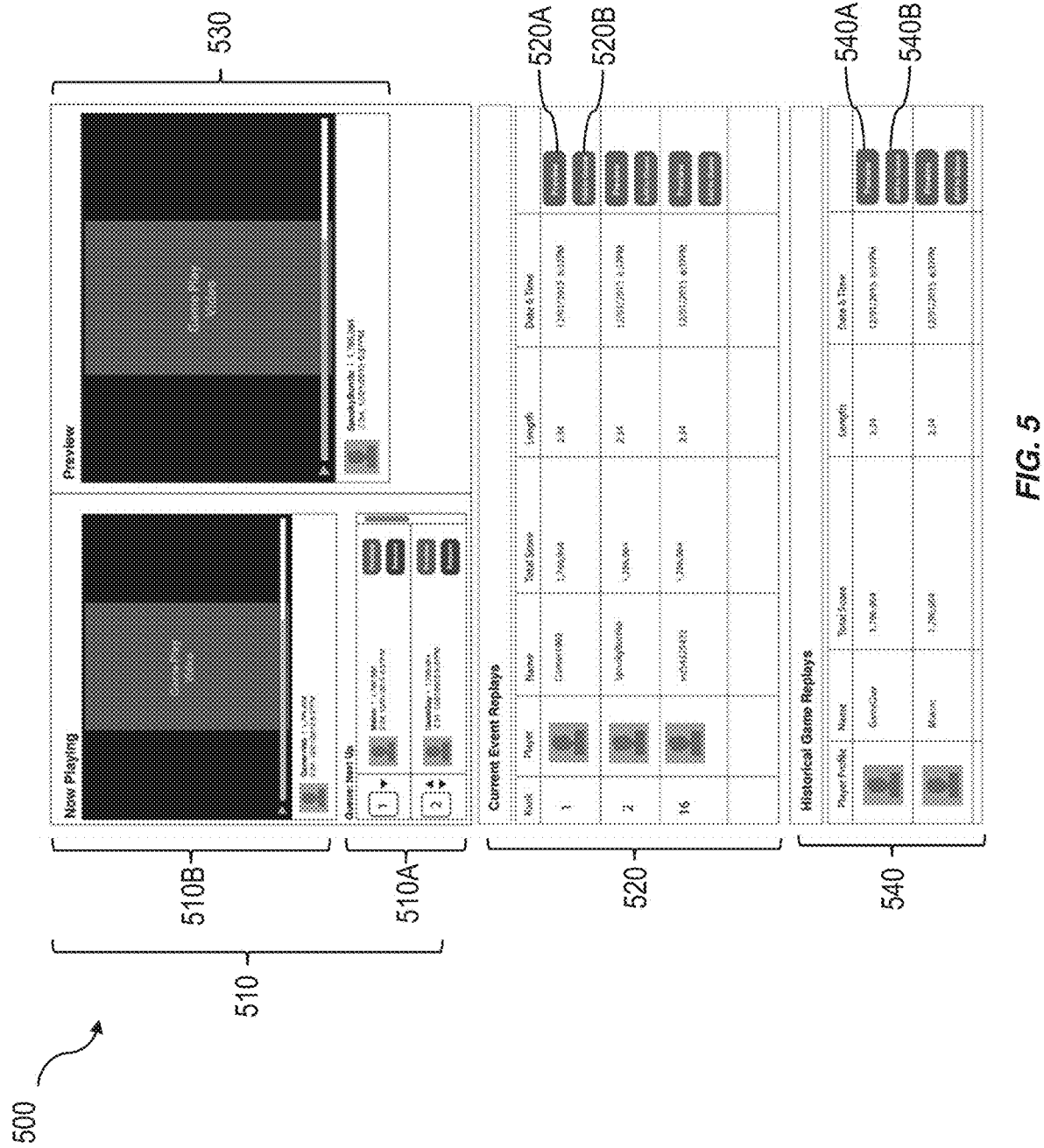
FIG. 5 is a user interface illustrating an example video control panel.

FIG. 5 is a user interface illustrating a video control panel 500. The video control panel 500 includes a video queue interface 510 for streamers 320 to view, select, and play videos or clips. The video queue interface 510 allows the streamer to interact with and control what is being broadcasted to his or her stream. The video queue interface 510 includes two components: a now playing stream 510B, and a queue 510A.

The now playing stream 510B shows the streamer 320 what replay is being currently broadcasted (e.g., the live video stream or feed). This is a persistent space that allows the streamer 320 to monitor what they are currently sharing even while using the window to preview streams or adjust replays in a way that will not be shared with the audience.

The queue 510A gives the streamer 320 the capability to control the order that video portions or replays will be shown. The streamer 320 may add individual video portions that they would like to show next, or change the order of what videos are up next to be broadcasted. If the streamer 320 chooses not to add anything to the queue, or if the queue becomes empty, the system can automatically stream video one of players using the across-match comparison, for example, by streaming video of one of the top three performing players 210, the video of the player 210, having the greatest change in score over a one minute period of time, and the like.

Video control panel 500 includes a list of players 520 participating in tournament matches and for which video capture is available for broadcast to a wider audience. The list of players 520 includes options to preview 520A or add 520B their replay to the queue 510A. Video control panel 500 further includes a preview space 530 for viewing video and a list of historical game replays 540, with options to preview 540A or add 540B the historical game replay to the queue 510A.

ESports management server 310, in combination with cross-match comparisons provided by across-match analytics server 260, automatically breaks down video captured at the clients 220, into highlight reels and key segments, provides cross-match game analytics, and assembles a suggested broadcast for the streamer 320. Thus eSports management system 310 enables automated functionality that acts as the streamer's 320 own "behind the scenes analyst team." This allows the streamer 320 to work as a one person team and easily select the correct footage to play without having to take breaks from the live stream to look up past footage or stats. Automatic analytics and features include the rank ordering of replays that causes replays and player lists to appear in the queue 510A in order of their current rank in the tournament. This makes it easy to find the replay for any player based upon where they stand. Prior to watching the video the streamer can know what level of player they are selecting and what the outcome of their game might be. In addition, replays can be ordered according to a custom comparison metric specified by the streamer 320 and used by the across-match analytics server 260 to compare player performance across separate matches.

Automated eSports management system 310 functionality includes providing a list of historical game replays. This can include links to historical replays of the same game that occurred during previous tournaments. This allows the streamer 320 to bring up their favorite footage for easy reference. For example, the streamer 320 can show the best game ever recorded, keep a reference of themselves playing the game, or use footage with a specifically interesting or relevant play or strategy.

Automated eSports management system 310 functionality includes providing notifications when there is a change within top of leaderboard. The streamer 320 can be notified (in addition to the leaderboard changing) when there is a change in position amongst top players in a tournament.

Automated eSports management system 310 functionality can include highlighting of interesting segments. For example, the across-match analytics server 260 can detect changes in game state where change in score per unit time is abnormally high or low. This makes it easy for streamer 320 to sort to key plays where a player 210, secures victory or focus on areas where an otherwise good player struggled and may have lost the game.

Automated eSports management system 310 functionality can include providing live score updates via segmenting gameplay into discrete blocks of time (sometimes referred to as "heartbeating"). Across-match analytics server 260 detects player 210, scores or other game state information as they play, not just at the end of the tournament. By using this information, eSports management system 310 can post real-time score updates to the streamer 320 and indicate whether or not the player 210, is currently on track to beat their previous score or secure a top spot in the leaderboard.

As used herein, the term heartbeating refers to collection of snapshots of game state data relating to a specific game instance at regular (or irregular) intervals during the course of game play. The data included in the snapshots can advantageously be structured data and can be sent to the automated eSports management system server for further analysis. The sending of the data from the snapshots collected during a game instance can be sent via a real-time or near real-time streaming approach, or optionally in some examples using an asynchronous approach involving temporarily caching data at the client machine.

The aforementioned game state data snapshots can be collected at intervals such as several times a second or possibly longer or shorter. Collection of data at this granularity can allow comparisons across multiple game instances. In some examples, such as for example a tournament arrangement, a player competing against one or more other players can be started on a common game "seed" such that the initial game conditions for the multiple competing players are consistent. For a player vs. player example, the multiple players may progress through the game instance at a similar rate. In other examples in which the game does not include direct player vs. player competition, the tournament arrangement is still possible because each player competing in a player vs. game contest is compared to at least one other player experiencing similar starting game conditions. Using the game state data collected via the heartbeating process, the progress of the two or more players who are competing can be compared on a logically chosen progress scale. In some examples, the progress scale may be along a time axis, but in other examples, the progress scale can be distance through a virtual world, number of milestones or objectives encountered/defeated/achieved/etc., or the like.

Comparison of the game state data snapshots between players in a common game seed can allow predictive analytics to project when key moments in the game (e.g. events or the like that have a heightened impact on which of the two or more players ultimately "wins" the competition) to be identified (or at least predicted with some degree of confidence) before they actually happen. Such predictions can be enabled by analysis and comparison with historical for a larger set of players who have previously played the game or other games that are determined to be similar in structure. In effect, a machine learning algorithm, a regression or correlation analysis, a similarity analysis, or the like can be performed using historical data with comparisons to the "live" or nearly real time game state data snapshots for an in-progress game instance. The current game instance for one or more players can be mapped in this manner such that key states are correlated with those that have occurred in previously completed game instances to thereby enable predictions of likely outcomes, to identify upcoming parts of the game instance that are likely to be highly relevant to the outcome of a competition, and the like.

In an online video gaming system, unified leaderboard rankings can be determined based on the combination of virtual currency and real currency. In some implementations, the current subject matter provides a translation between cash and virtual currency matches on a shared leaderboard. Because players can play for both cash and virtual currency, there can be a unified leaderboard mixing players who compete in cash tournaments and players who do not compete in cash tournaments. Further, this direct translation can carry over to trophies awarded by the games or by the gaming network. A trophy can be a virtual good, in some cases non-transferable, which can be granted once per player account that achieves some milestone, such as number of matches won, cash games played, changing a setting, and the like.

In some online gaming networks or systems, a player can compete in one or many games via participation in a leaderboard. This participation may be as an individual or as part of a temporary or permanent alliance of players (relating to the common "clan" structure). Some implementations of the current subject matter can be used to encourage players to participate in multiple network games. Players who do so can have an identity and a presumed alliance, which can provide increased revenue and greater retention across the games played.

In an example implementation of an online gaming system, players in the online video gaming competition system share a common cash balance across all games that are cash enabled and these balances are treated similarly in terms of value and leadership across a multitude of games. In addition, the example system can offer a "practice" virtual currency, which are specific to each game, and which may or may not be associated with the game's own virtual currency. The system can grant virtual prizes for participation in tournament activities across all games and awards a variety of real-life prizes in a sweepstakes-style system of prizing.

The current subject matter can include a system of advanced leaderboards; leagues; trophies; and prizing that together provide the network. The system can include a tool that provides a common leaderboard structure, which: provides logic for challenge provision of players in league or non-league circumstances; contemplates and provides rules around surfacing available players to challenge; provides a translation between cash and virtual currency matches on a shared leaderboard; and provides for prizes, including medals (the primary measure of success on the leaderboards), trophies/achievements on both a game and a system-wide basis, non-cash related prizes on the platform layer, and any in-game rewards or prizes assigned on an ad-hoc basis.

Figure 6:
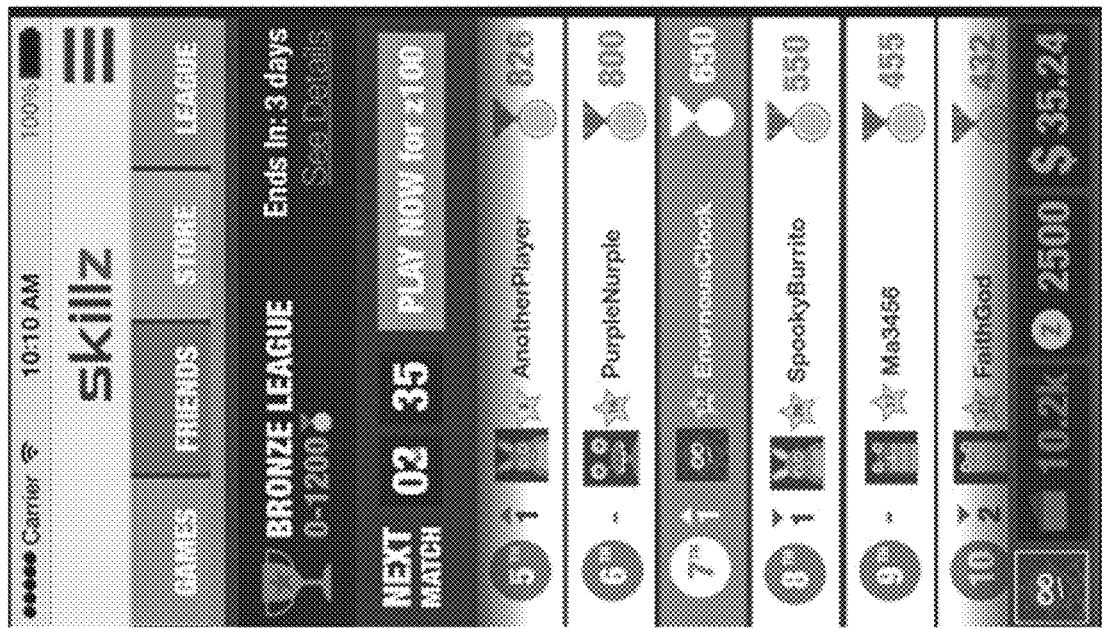
FIG. 6 is an illustration of an example unified leaderboard.

FIG. 6 is an illustration of an example unified leaderboard. The example unified leader board shows a common leaderboard structure that provides a translation between cash and virtual currency matches on a shared leaderboard. This includes a common medal count (right) and ranking (left) on a system-wide basis.

Figure 7:
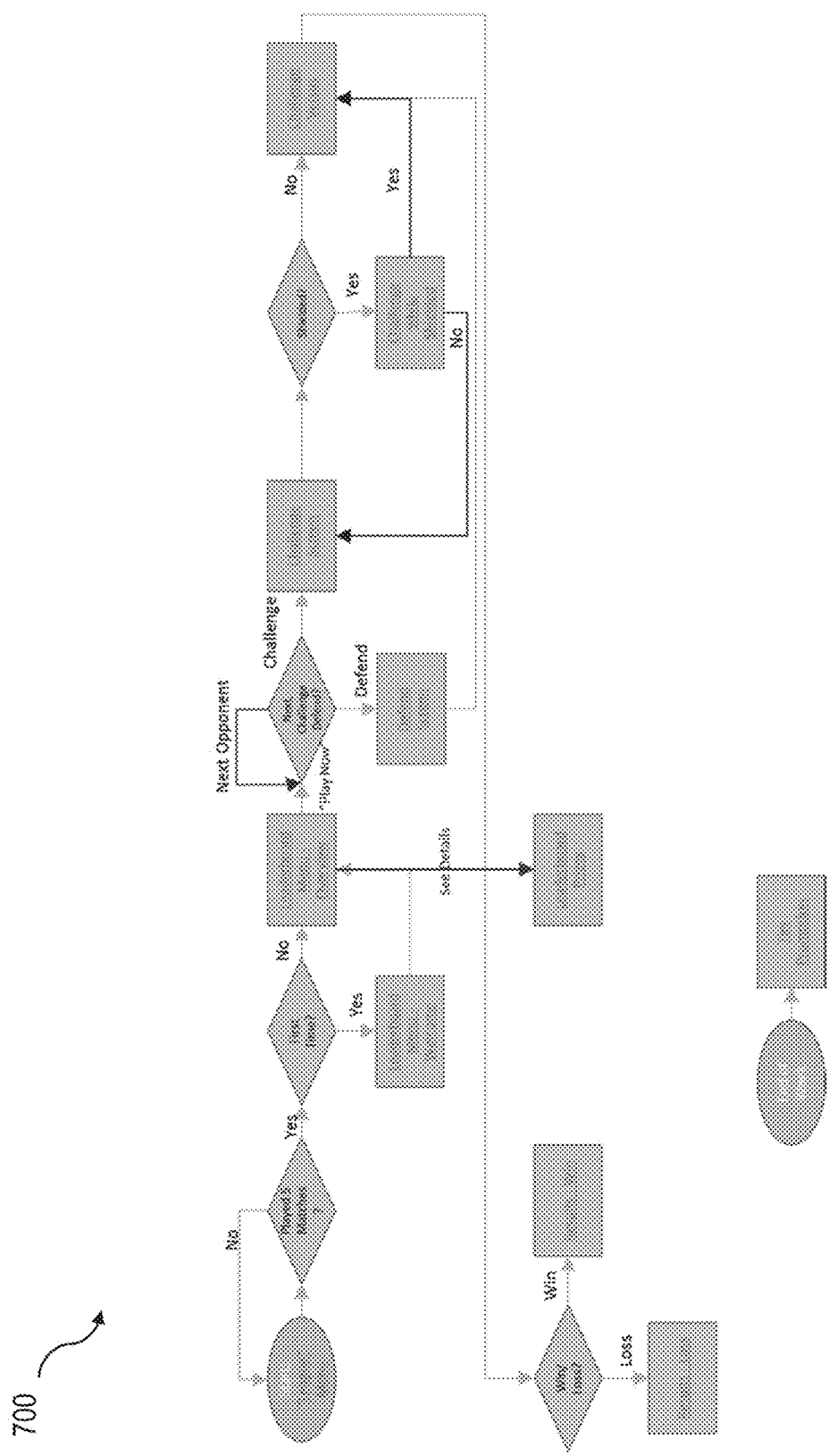
FIG. 7 is a process flow diagram illustrating a process of defending, challenging, and viewing the leaderboard.

The current subject matter can provide logic for challenge provision of players in league or non-league circumstances. For example, leaderboards exist across many games and in some multi-game systems (notably Xbox Live gamerscore and related concepts). Using the current subject matter, however, players play across multiple games of every sort and size, and that players are typically competing for: cash outcome on the match; virtual currency outcome on the match, whether system-level and/or a game's individual currency (or currencies); and prizes, which may or may not be cash, virtual currency or even a real-world item. FIG. 7 is a process flow diagram illustrating an example logic flow for defending, challenging, and viewing the leaderboard in league or non-league circumstances. Players can select "play now" from a menu, which will challenge the next opponent. Similarly, a challenged player can defend the challenge. The outcome results in a change in the leaderboard standings.

The current subject matter can explicitly allow players to compete against each other for both virtual currency and cash, with a valuation currently pegged at a unit of virtual currency being 1/100th of the value of a dollar for purposes of determining the number of medals awarded for the winner of a match. In some implementations, the combination of virtual currency and real currency is used to implement a unified leaderboard.

These challenges may occur as a random 1 vs. 1 or team vs. team or clan vs. clan match, but they also occur within a league structure, where players are required to challenge other members of their league and this combined method is used to award medals.

Further, the current subject matter makes the medal awards in a way that is consistent across different games. Thus, winning a match for the same stakes where the players have the same medal counts in different games (e.g., 500 medals) can pay exactly the same number of medals. In addition, virtual currency matches can also be pegged to a standard ratio (currently, virtual currency worth $0.01 would be assigned the value of unit of virtual currency), whether the currency is actually available for purchase for cash or not.

In some implementations, the current subject matter contemplates and provides rules around surfacing available players to challenge. The example system can surfaces suggested matches based on a combination of cash and virtual currency.

In some implementations, the current subject matter provides a translation between cash and virtual currency matches on a shared leaderboard. Because players can play for both cash and virtual currency, there can be a unified leaderboard mixing players who compete in cash tournaments and players who do not compete in cash tournaments. Further, this direct translation can carry over to trophies awarded by the games or by the gaming network. A trophy can be a virtual good, in some cases non-transferable, which can be granted once per player account that achieves some milestone, such as number of matches won, cash games played, changing a setting, and the like.

Figure 8:
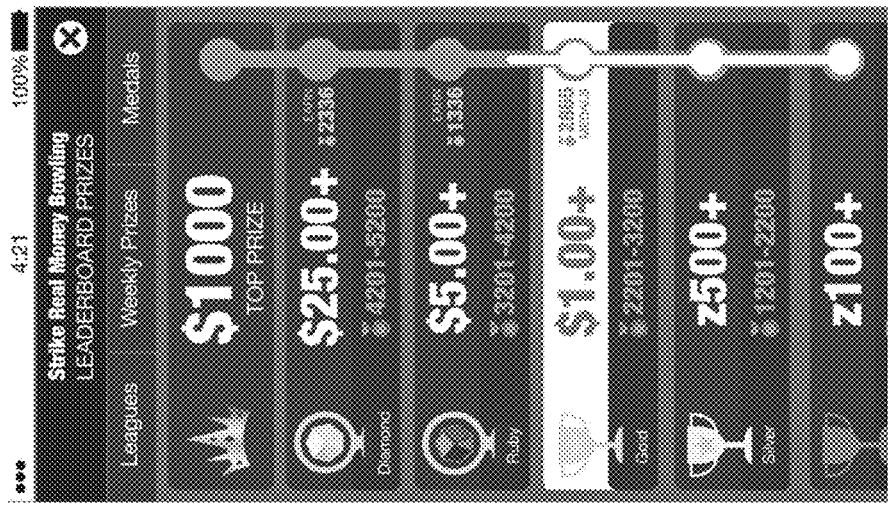
FIG. 8 is an illustrating of an example leaderboard prize page.

In some implementations, the current subject matter provides for prizes, including medals, which can be a primary measure of success on the leaderboards, trophies/achievements on both a game and a network-wide basis, non-cash prizes on the platform layer, and any in-game rewards or prizes assigned on an ad-hoc basis. For example, FIG. 8 is an illustrating of an example leaderboard prize page.

As described, some implementations of the current subject matter can offer multiple rewards to the victor(s), on both a game by game and a network-wide system basis. These awards include medals, which are the current measure of a player's rank in any associated leaderboard (global, local, clan, team, friends, and the like) and are properly seen as a measure of skill. Further, the award of trophies/achievements can contain a large set of items unique to the network, where many of these will reward standard actions, including cross-game or network actions. A simple example of the latter is to change one's profile avatar for a particular trophy/achievement, where the action contemplated is only partially relevant to the game in question.

Although a few variations have been described in detail above, other modifications or additions are possible. For example, although some examples have been described with reference to asynchronous single player games, the current subject matter can apply to any tournament where there are separate matches occurring. These separate matches can be multiplayer matches. For example, the current subject matter can apply to an online tournament of digital tennis in which two players compete directly sharing the same game state but their performance is compared to another match having two different and competing players.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLD5), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   receiving first game state data captured from a first gaming application executing on a first client and characterizing in-game information of a first match of a peer-to-peer digital gaming tournament, the first game state data captured prior to completion of the first match, the first game state data further characterizing a value of one or more in-game data objects at two or more points of time during the first match, the one or more in-game data objects internal to the first gaming application, originally generated by the first gaming application, and used by the first gaming application for execution of the first match;
   receiving second game state data captured from a second gaming application executing on a second client and characterizing in-game information of a second match of the peer-to-peer digital gaming tournament, the first match and the second match being separate and disparate gaming instances, the first match having a first plurality of game states, the second match having a second plurality of game states, the first plurality of game states differing from the second plurality of game states, the second game state data further characterizing a value of the one or more in-game data objects at the two or more points of time during the second match;
   comparing the first game state data and the second game state data using a predefined comparison rule by computing a measure of a performance of a first player in the first match with a measure of a performance of a second player in the second match; and
   providing the comparison;
   wherein at least one of the receiving, comparing, and providing is performed by at least one data processor forming part of at least one computing system.

2. The method of claim 1 wherein the predefined comparison rule defines the measure of the performance of the first player and the measure of the performance of the second player.

3. The method of claim 1 further comprising:
   receiving a first video capture from the first client of a display of the first match;
   receiving a second video capture from the second client of a display of the second match;
   selecting, based on the comparison, a portion of the first video capture or a portion of the second video capture; and
   streaming at least one of the portion of the first video capture and the portion of the second video capture to at least one viewing client.

4. The method of claim 1 further comprising:
   comparing the first game state data and the second game state data periodically and at multiple time points.

5. The method of claim 1 wherein the first match and the second match begin at different times, the method further comprising:
   registering in time the first game state data to the second game state data, wherein time is referenced to a game time, an absolute time, or a tournament time.

6. The method of claim 1 wherein the first client receives game data from a third party game server, the game data for implementing the first match.

7. The method of claim 1 wherein the first match and the second match are separate instances of the digital video game.

8. The method of claim 7 wherein the digital video game is an asynchronous game.

9. The method of claim 7 wherein the digital video game is a single player asynchronous game.

10. The method of claim 1 wherein the first match and the second match are played concurrently.

11. The method of claim 1 wherein the predefined comparison rule is previously defined by a user.

12. The method of claim 1 wherein the comparing includes identifying at least one period of time during the first match or the second match in which an event occurs.

13. The method of claim 1 wherein the receiving of the first game state data occurs during the first match.

14. The method of claim 13 wherein the receiving of the first game state data occurs periodically during the first match.

15. The method of claim 1 wherein the first game state data includes: instantaneous score, change in score over a predefined period of time, character position, character health.

16. The method of claim 1 wherein the first match and the second match are initiated with a common random number seed to provide common starting conditions.

17. The method of claim 1 wherein the first client and the second client are separate computing systems in communication with a third party game server and an analytics server via a network, the third party game server separate from the analytics server, at least one of the receiving, comparing, and providing is performed by the analytics server.

18. A computer program product comprising a non-transitory machine-readable medium storing instructions that, when executed by one or more programmable processors, cause the one or more programmable processors to perform operations comprising:
receiving first game state data captured from a first gaming application executing on a first client and characterizing in-game information of a first match of a peer-to-peer digital gaming tournament, the first game state data captured prior to completion of the first match, the first game state data further characterizing a value of one or more in-game data objects at two or more points of time during the first match, the one or more in-game data objects internal to the first gaming application originally generated by the first gaming application, and used by the first gaming application for execution of the first match;
receiving second game state data captured from a second gaming application executing on a second client and characterizing in-game information of a second match of the peer-to-peer digital gaming tournament, the first match and the second match being separate and disparate gaming instances, the first match having a first plurality of game states, the second match having a second plurality of game states, the first plurality of game states differing from the second plurality of game states, the second game state data further characterizing a value of the one or more in-game data objects at the two or more points of time during the second match;
comparing the first game state data and the second game state data using a predefined comparison rule by computing a measure of a performance of a first player in the first match with a measure of a performance of a second player in the second match; and
providing the comparison.

19. A system comprising a machine-readable medium storing instructions and one or more programmable processors configured to perform operations comprising:
receiving first game state data captured from a first gaming application executing on a first client and characterizing in-game information of a first match of a peer-to-peer digital gaming tournament, the first game state data captured prior to completion of the first match, the first game state data further characterizing a value of one or more in-game data objects at two or more points of time during the first match, the one or more in-game data objects internal to the first gaming application, originally generated by the first gaming application, and used by the first gaming application for execution of the first match;
receiving second game state data captured from a second gaming application executing on a second client and characterizing in-game information of a second match of the peer-to-peer digital gaming tournament, the first match and the second match being separate and disparate gaming instances, the first match having a first plurality of game states, the second match having a second plurality of game states, the first plurality of game states differing from the second plurality of game states, the second game state data further characterizing a value of the one or more in-game data objects at the two or more points of time during the second match;
comparing the first game state data and the second game state data using a predefined comparison rule by computing a measure of a performance of a first player in the first match with a measure of a performance of a second player in the second match; and
providing the comparison.

20. The method of claim 3, wherein the first client includes a first peer-tournament module that captures the first game state data from the first gaming application and transmits the captured game state data to an analytics server, the second client includes a second peer-tournament module that captures the second game state data from the second gaming application and transmits the captured game state data to the analytics server.

21. The method of claim 20, wherein the first peer-tournament module captures the first video capture by at least: capturing first user interface screen shots at a predetermined rate, capturing first open graphics library layers, or capturing first data through a first pixel buffer; and forming the first video capture;
wherein the second peer-tournament module captures the second video capture by at least: capturing second user interface screen shots at the predetermined rate, capturing second open graphics library layers, or capturing second data through a second pixel buffer; and forming the second video capture.

* * * * *